US00RE40807E

(19) United States
(12) Reissued Patent
Kovacs

(10) Patent Number: US RE40,807 E
(45) Date of Reissued Patent: Jun. 30, 2009

(54) FLUID-OPERATED POWER TOOL

(75) Inventor: John R. Kovacs, Blairstown, NJ (US)

(73) Assignee: torcUp. Inc., Easton, PA (US)

(21) Appl. No.: 11/803,417

(22) Filed: May 14, 2007

Related U.S. Patent Documents

Reissue of:
(64) Patent No.: 6,068,068
Issued: May 30, 2000
Appl. No.: 09/335,410
Filed: Jun. 17, 1999

U.S. Applications:
(63) Continuation of application No. 08/910,963, filed on Aug. 7, 1997, now abandoned.

(51) Int. Cl.
*E21B 3/00* (2006.01)
B25B 13/46

(52) U.S. Cl. ..... 173/218
(58) Field of Classification Search ..... 173/218, 173/213, 220, 177, 178, 53, 55, 140; 81/57.39
See application file for complete search history.

(56) References Cited

U.S. PATENT DOCUMENTS 3,669,012 A * 6/1972 Nebel ..... 100/121
3,802,517 A * 4/1974 Cooke-Yarborough ..... 173/18
4,031,893 A * 6/1977 Kaplan et al. ..... 604/136
4,756,241 A * 7/1988 Sakurahara et al. ..... 92/233
4,896,584 A * 1/1990 Stoll et al. ..... 92/5 R
4,938,296 A * 7/1990 Brazell, II ..... 173/185
4,938,745 A * 7/1990 Sagstetter ..... 604/263
5,003,847 A * 4/1991 Wagner ..... 81/57.39
5,076,225 A * 12/1991 Tokoro et al. ..... 123/193.1
5,203,238 A * 4/1993 Ferguson ..... 81/57.39
5,327,864 A * 7/1994 Regueiro ..... 123/260
5,544,627 A * 8/1996 Terziev et al. ..... 123/53.1
5,630,353 A * 5/1997 Mittlefehldt et al. ..... 92/71
6,068,068 A * 5/2000 Turoff ..... 173/218

* cited by examiner

*Primary Examiner*—Rinaldi I. Rada
*Assistant Examiner*—John Paradiso
(74) *Attorney, Agent, or Firm*—Michael J. Striker

(57) ABSTRACT

A fluid-operated power tool has an engaging part with a turnable engaging element for engaging and turning a threaded connector, and a power drive part with a power drive operative for turning the engaging part, wherein the power drive part includes a fluid-operated cylinder-piston unit, the power drive part having an end spaced from the engaging part and provided with an inner opening with a first connection, and a reaction member formed as a reaction arm which is turnable between a plurality of positions around an axis of the power drive part and fixable in each of the positions, the reaction arms having a projection which is insertable in the opening and being provided with second connection with the first connection so as to connect the reaction arm with the power drive part.

8 Claims, 2 Drawing Sheets

FLUID-OPERATED POWER TOOL

Matter enclosed in heavy brackets [ ] appears in the original patent but forms no part of this reissue specification; matter printed in italics indicates the additions made by reissue.

This application is a continuation of application Ser. No. 08/910,963 filed Aug. 7, 1997 *now abandoned.*

BACKGROUND OF THE INVENTION

The present invention relates to fluid-operated power tools.

Fluid-operated power tools, such as for example hydraulic torque wrenches, use a reaction element to react against a neighboring object. Such a reaction element can be formed as a reaction arm which is adjustable in several positions 360° around an axis of the cylinder-piston unit of the power drive. In the known power tool the reaction arm is provided with inner splines which cooperate with outer splines on the cylinder portion of the power drive. However, this has a substantial disadvantage. The outer splines of the cylinder portion in some instances abut themselves against a stationary object, such as for example a wall or the pipe, and the splines can get crushed. As a result, the reaction arm can not be mounted anymore for applications where the reaction arm abuts against an adjacent nut.

SUMMARY OF THE INVENTION

Accordingly, it is an object of the present invention to provide a fluid-operated power tool which avoids the disadvantages of the prior art.

In keeping with these objects and with others which will become apparent hereinafter, one feature of the present invention resides, briefly stated, in a fluid-operated power tool which has an engaging part with a turnable engaging element for engaging and turning a threaded connector, and a power drive part with a power drive operative for turning the engaging part, wherein the power drive part includes a fluid-operated cylinder-piston unit, said power drive part having an end spaced from said engaging part and provided with an inner opening with first connecting means; and a reaction member formed as a reaction arm which is turnable between a plurality of positions around an axis of said power drive part and fixable in each of said positions, said reaction arms having a projection which is insertable in said opening and being provided with second connecting means cooperating with said first connecting means so as to connect said reaction arm with said power drive part.

When the fluid-operated power tool is designed in accordance with the present invention, it eliminates the disadvantages of the prior art and provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
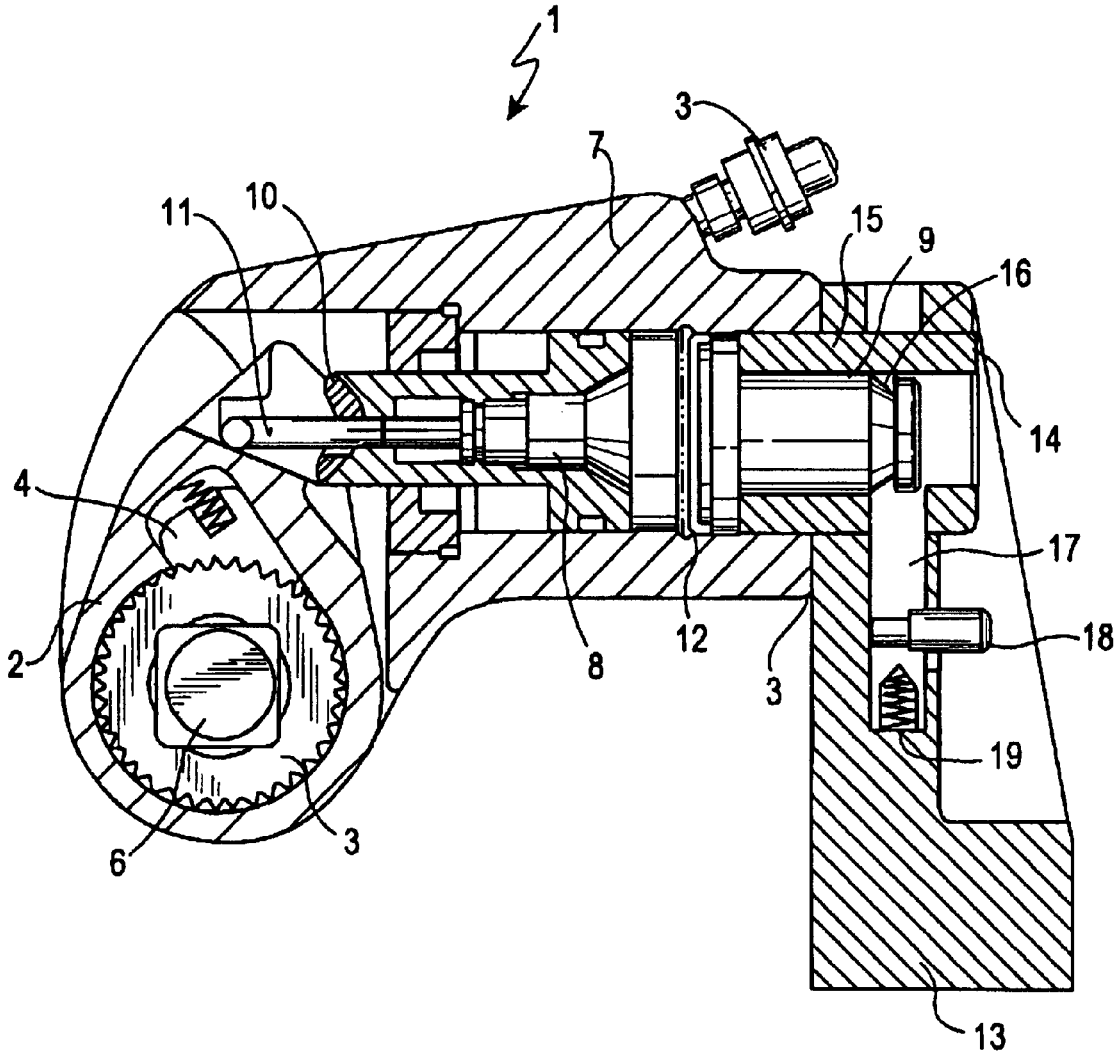
FIG. 1 is a view showing a section of a fluid-operated power tool in accordance with the present invention.
Figure 2:
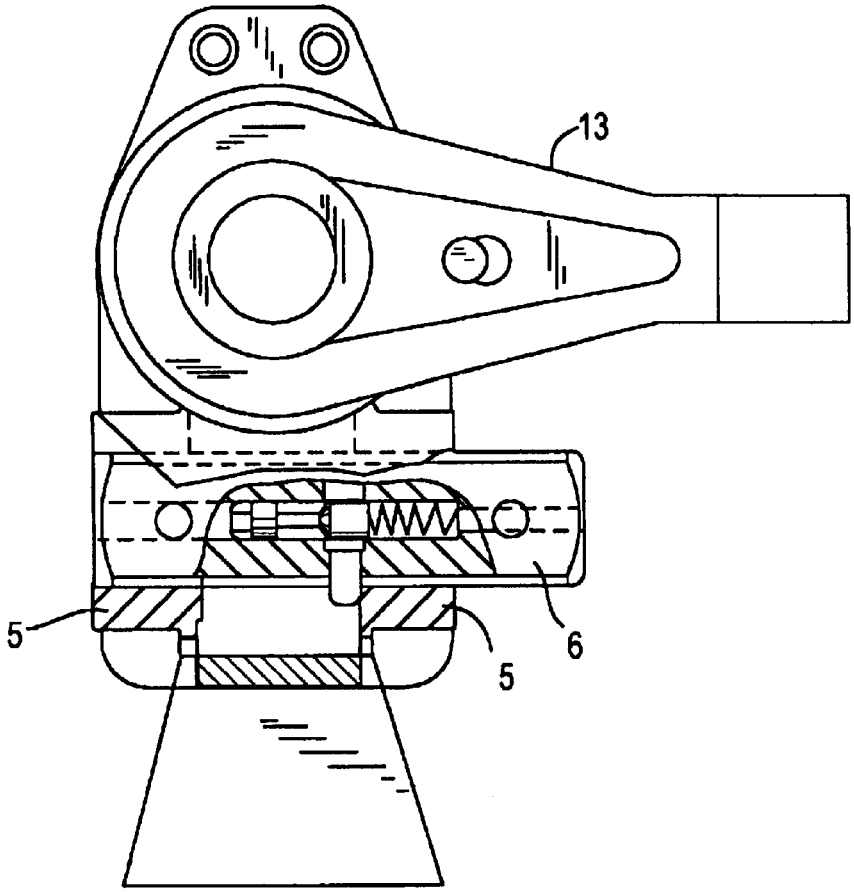
FIG. 2 is an end view of the inventive fluid-operated power tool of FIG. 1.
Figure 3:
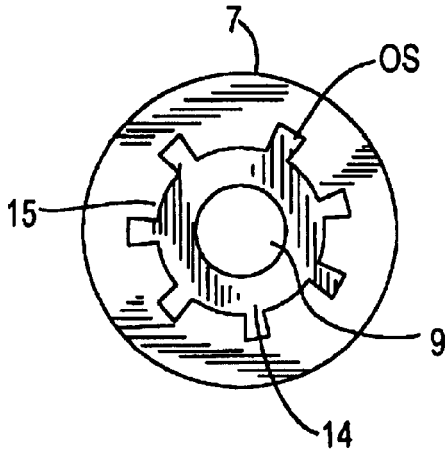
FIG. 3 is a view showing a section taken along the line III—III in FIG. 1.

A fluid-operated power tool in accordance with the present invention has a housing which is identified as a whole with reference numeral 1. The tool has an engaging part for engaging and turning a threaded connector such as a bolt, nut and the like. The engaging part has a drive plate 2 provided with an opening in which a ratchet 3 is rotatably supported and engaged by a pawl 4. An engaging projection 6 is provided in the ratchet 3 and supported in sleeves 5.

The fluid-operated power tool further has a power drive part with a power drive for turning the drive plate 2 with the ratchet 4, and thereby the ratchet 3, so as to turn the threaded connector. The power drive includes a cylinder 7 formed in the housing 1, a piston 8 movable in the cylinder, a pivotable slider 10 arranged at the left side of a piston rod of the piston 8 and cooperating with a curved surface of the drive plate 2, and a rod 11 which connects the piston rod of the piston 8 with the drive plate to pull the drive plate back. The right open end of the cylinder 7 of the power-drive part is closed by an end cap 12 having a projecting portion 9.

The fluid-operated power tool further has a reaction arm 13 with an opening in its upper part in FIG. 1. A sleeve 14 is arranged in the opening of the reaction arm and extends axially to the left in FIG. 1. A portion of the sleeve 14 which extends axially outwardly beyond the reaction arm 1 and is provided with outer connecting means formed for example by a plurality of outer splines OS. In turn, a right end of the cylinder 7 is provided with an inner opening with a plurality of inner splines IS which in the mounted position interengage with the outer splines OS of the sleeve 14. As can be seen from FIG. 1, the sleeve 14 has an inner opening 15 with which it is fitted on the projection 9 of the end plug, so that the reaction arm 13 as a whole can be held on the projection 9. Since the splines usually have a relatively loose fit, it is necessary to provide either a large diameter of the splines or a long length of the spline engagement, which however increases a total length of the tool. In contrast, in the applicants invention, the splines are short and at the same time have a small diameter. However, the internal guide formed by the projection 9 prevents side-loading of the splines and their early failure.

The locking mechanism is provided for retaining the reaction arm on the power drive part of the tool. The locking mechanism includes a depression provided in the projection 9 of the end cup and formed for example as a groove 16, and a slider 17 which is movable in a vertical direction in FIG. 1 so as to engage in the depression or disengage from it. In the engaged condition the reaction arm 13 is reliably retained on the tool, while in the disengaged condition when the slider 6 is displaced downwardly beyond the outer contour of the sleeve 14, the arm 13 can be removed from the tool. The engaged condition is obtained by a button 18 which is spring biased upwardly by a spring 19. In order to disengage the slider 17 from the depression 16, an operator presses the button 18 downwardly against the force of the spring 19.

In order to provide an abutment of the reaction arm against a neighboring object in any position, the reaction arm can be removed from the tool, turned by a desired angle, and again mounted on the tool by interengagement of the splines OS and IS, and then locked in this position.

While no inlet and outlet ports are shown for the cylinder-piston unit of the inventive tool, they are well known in the art. In operation when a pressure fluid is admitted into the cylinder 7, it displaces the piston 8 with the piston rod, which in turn turns the drive plate 2 with the pawl 4, and the pawl 4 turns the ratchet 3 and the projection 6 engaged with the threaded connector, so as to turn the threaded connector.

It will be understood that each of the elements described above, or two or more together, may also find a useful application in other types of constructions differing from the types described above.

While the invention has been illustrated and described as embodied in fluid-operated power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid-operated power tool, comprising an engaging part with a turnable engaging element for engaging and turning a threaded connector, and a power drive part with a power drive operative for turning the engaging part, wherein the power drive part includes a fluid-operated cylinder-piston unit, said power drive part having an end spaced from said engaging part and provided with an inner opening with first connecting means, and a reaction member formed as a reaction arm which is turnable between a plurality of positions around an axis of said power drive part and fixable in each of said positions, said reaction arms having a projection which is insertable in said opening and being provided with second connecting means cooperating with said first connecting means so as to connect said reaction arm with said power drive part.

2. A fluid-power tool as defined in claim 1, wherein said first connecting means are formed as a plurality of inner splines, said second connecting means being formed as a plurality of outer splines.

3. A fluid-power tool as defined in claim 1, wherein said cylinder-piston unit has an axis, said opening and said projection having axes which coincide with one another and with said axis of said cylinder-piston unit.

4. A fluid-power tool as defined in claim 1, and further comprising guide means provided in said power drive part, said projection with said second connecting means being guided on said guide means.

5. A fluid-power tool as defined in claim 4, wherein said power drive part has an open end, said guide means being formed as an end cap closing said open end.

6. A fluid-power tool as defined in claim 5, wherein said projection with said second connecting means has an inner opening and is fitted with said inner opening on said end cap.

7. A fluid-power tool as defined in claim 6; and further comprising means for locking said reaction arm on said end cap and unlocking said reaction arm from said end cap, said locking end and locking means including a depression formed in said end cap, a slider movable in said reaction arm and engageable in said depression as well as disengageable from said depression, and a button operatable by a user for moving said slider into said depression and releasing said slider from said depression.

8. A fluid-power tool as defined in claim 7; and further comprising spring means which bias said button so as to move said slider into said depression for locking.

* * * * *